(12) United States Patent
Hu (10) Patent No.: US 12,197,691 B2
(45) Date of Patent: Jan. 14, 2025

(54) DISPLAY PANEL INCLUDING CONDUCTIVE WIRE SEGMENTS CONNECTED TO TOUCH ELECTRODES

(71) Applicant: Guangzhou China Star Optoelectronics Semiconductor Display Technology Co., LTD., Guangdong (CN)

(72) Inventor: Xiaobin Hu, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 17/780,535

(22) PCT Filed: May 13, 2022

(86) PCT No.: PCT/CN2022/092708
§ 371 (c)(1),
(2) Date: May 27, 2022

(87) PCT Pub. No.: WO2023/201794
PCT Pub. Date: Oct. 26, 2023

(65) Prior Publication Data
US 2024/0176455 A1    May 30, 2024

(30) Foreign Application Priority Data

Apr. 22, 2022  (CN) .......................... 202210430315.4

(51) Int. Cl.
*G06F 3/047*      (2006.01)
*G06F 3/044*      (2006.01)

(52) U.S. Cl.
CPC .............. *G06F 3/047* (2013.01); *G06F 3/044* (2013.01)

(58) Field of Classification Search
CPC ........ G06F 3/047; G06F 3/044; G06F 3/0412; G06F 3/04164; G06F 3/0443
See application file for complete search history.

(56) References Cited

U.S. PATENT DOCUMENTS

2015/0001482 A1    1/2015  Jung
2017/0371469 A1*  12/2017  Lee ....................... G06F 3/0447

FOREIGN PATENT DOCUMENTS

CN    106933416    7/2017
CN    107025012    8/2017
(Continued)

OTHER PUBLICATIONS

International Search Report and the Written Opinion Dated Dec. 12, 2022 From the International Searching Authority Re. Application No. PCT/CN2022/092708 and Its Translation Into English. (17 Pages).

*Primary Examiner* — Yaron Cohen (57) ABSTRACT

A display panel is provided, including a touch layer including a plurality of touch electrodes; a plurality of touch wires, wherein each of the touch wires is connected to one touch electrode respectively to transmit touch signals of the touch electrodes; and a plurality of conductive wire segments, wherein each of the conductive wire segments and the touch electrodes are in parallel connection. By adding impedance of parallel connection to each of the touch electrodes, voltage drop incurred by the common electrodes and the conductive wire segments is reduced, and the stability of the common voltage signal transmitted in the display region of the display panel is improved.

20 Claims, 4 Drawing Sheets

(56) References Cited

FOREIGN PATENT DOCUMENTS

| CN | 107065269 | 8/2017 |
| CN | 108037608 | 5/2018 |
| CN | 112882598 | 6/2021 |
| CN | 113986038 | 1/2022 |

\* cited by examiner

DISPLAY PANEL INCLUDING CONDUCTIVE WIRE SEGMENTS CONNECTED TO TOUCH ELECTRODES

RELATED APPLICATIONS

This application is a National Phase of PCT Patent Application No. PCT/CN2022/092708 having International filing date of May 13, 2022, which claims the benefit of priority of Chinese Patent Application No. 202210430315.4 filed on Apr. 22, 2022. The contents of the above applications are all incorporated by reference as if fully set forth herein in their entirety.

FIELD AND BACKGROUND OF THE INVENTION

The present application belongs to the field of display technology, and particularly to a display panel.

With development of display industry technology, applications of touch technology on display panels have become more and more widespread. The touch technology includes In-cell technology. The In-cell technology refers to technology that touch electrodes are integrated in liquid crystal panels.

Wherein, a same electrode structure is generally adopted in touch electrodes and common electrodes, and time division driving is adopted for driving of touch electrodes and the common electrodes. As a number of channels in touch chips is limited, and a number of assignable touch wires is relative more, redundant wires are in presence. As the redundant wires are only connected to common signal lines in non-display regions of display panels but do not affect common electrodes in display regions, and the common electrodes of the display regions have impedance, common voltage signals in the display regions of the display panels are led to be unstable.

As the redundant wires are only connected to common signal lines in non-display regions of display panels but do not affect common electrodes in display regions, and the common electrodes of the display regions have impedance, common voltage signals in the display regions of the display panels are led to be unstable, which is a technical problem.

SUMMARY OF THE INVENTION

Embodiments of the present application provide a display panel to solve the problem that the common voltage signals in the display regions of the current display panels are unstable.

One embodiment of the present application provides a display panel, including:
a touch layer including a plurality of touch electrodes arranged in an array manner;
a plurality of touch wires, wherein each of the touch wires is connected to one of the touch electrodes respectively to transmit touch signals of the touch electrodes; and
a plurality of conductive wire segments disposed in a same layer with the touch wires, wherein each of the conductive wire segments and the touch electrodes are in parallel connection.

In the display panel of the embodiments of the present application, by configuring redundant wires in a form of the plurality of conductive wire segments, and by configuring each conductive wire segment and the touch electrodes to be in parallel connection, i.e., each touch electrode is provided with impedance of the parallel connection, overall impedance transmitted by the touch electrodes and the conductive wire segments can be reduced. Therefore, voltage drop caused by the touch electrodes and conductive wire segments is reduced. Because the common electrodes and the touch electrodes are sharing electrodes in a form of time-division driving, the voltage drop incurred by the common electrodes and the conductive wire segment is reduced, thereby improving stability of the common voltage signals transmitted in the display region of the display panel.

DESCRIPTION OF SPECIFIC EMBODIMENTS OF THE INVENTION

The technical solutions in the embodiments of the present application are clearly and completely described in the following with reference to accompanying drawings in the embodiments of the present application. Obviously, the described embodiments are only part of the embodiments of the present application, but are not all embodiments of the present application. All other embodiments obtained by those skilled in the art based on the embodiments of the present application without creative efforts are within the scope of the present application.

In order to solve a problem that common voltage signals in display regions of the current display panels are unstable, embodiments of the present application provide a display panel. The following is described with reference to accompanying figures.

Figure 1:
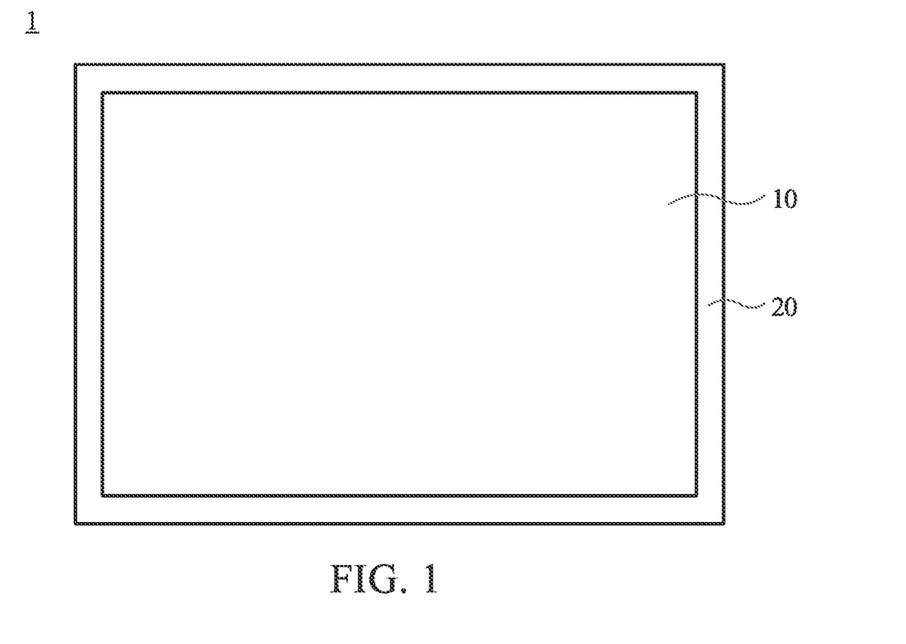
FIG. 1 is a structural schematic diagram of a terminal device provided by one embodiment of the present application.

Exemplarily, please refer to FIG. 1. FIG. 1 is a structural schematic diagram of a terminal device provided by one embodiment of the present application. One embodiment of the present application provides a terminal device 1. The terminal device 1 can include a display panel 10 and a housing 20. The housings 20 is connected to the display panel 10 to bear the display panel 10. Exemplarily, the terminal device 1 can be a mobile electronic device such as a mobile phone, a tablet, a computer, etc. The terminal device 1 can also be a computer device, a video playback device, a television, a vehicle-mounted computer, and other devices with display and touch functions.

Wherein, the display panel 10 is a component used for display in the terminal device 1, and a user can perform touch operations on the display panel 10 to achieve different playback effects. The display panel 10 can be a liquid crystal panel, i.e., the terminal device 1 can be a liquid crystal display (LCD) device. A structure of the LCD is that liquid crystal cells are placed between two parallel glass substrates, a thin film transistor (TFT) is disposed on a lower glass substrate, and a color filter is disposed on an upper glass substrate. A rotation direction of liquid crystal molecules is controlled by variation of a signal and a voltage of the TFT, thereby realizing a display purpose of controlling whether a polarized light of each pixel is emitted or not. With development of touch technology, integrating the touch panel and the liquid crystal panel in one piece includes an In-cell manner and an On-cell manner. Wherein, the In-cell manner refers to embedding a touch panel function into the liquid crystal cells, and the On-cell manner refers to embedding the touch panel function between a color filter substrate and a polarizer. In the present application, a display panel 10 manufactured by the In-cell manner is taken as an example. Wherein, a same electrode structure is generally adopted in a touch electrode and a common electrode, and time division driving manner is adopted for driving. As a number of channels in touch chips is limited, and a number of assignable touch wires is relative more, redundant wires are in presence. The redundant wires can be understood as auxiliary wires. As the redundant wires are only connected to common signal lines in non-display regions of display panels and do not affect common electrodes in display regions, and the common electrodes of the display regions have voltage drop, a common voltage signal in the display region of the display panel is led to be unstable.

In order to solve aforesaid technical problem, embodiments of the present application improve wiring manner of the display panel 10.

Figure 2:
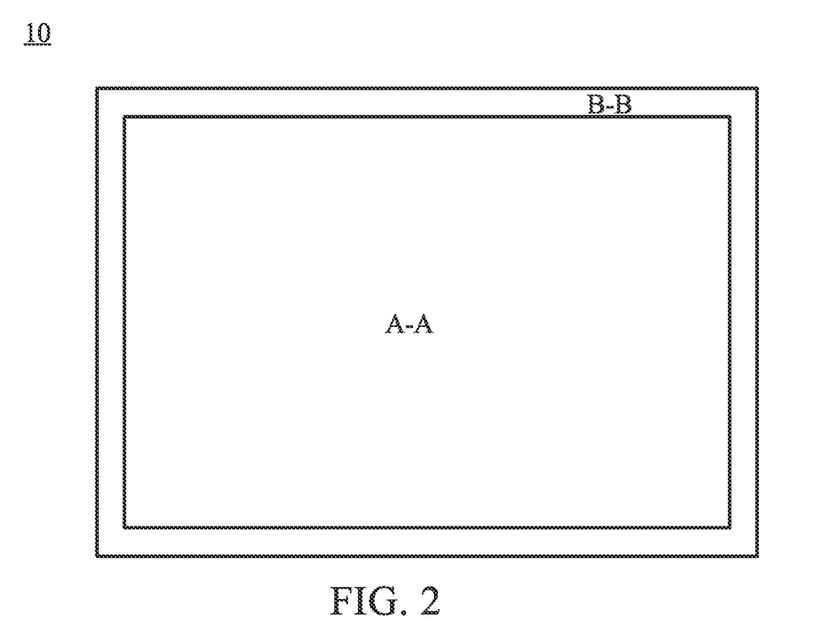
FIG. 2 is a first structural schematic diagram of a display panel of the terminal device illustrated in FIG. 1.

Exemplarily, please combine FIG. 1 and refer to FIG. 2. FIG. 2 is a first structural schematic diagram of a display panel of the terminal device illustrated in FIG. 1. The display panel 10 can include a display region A-A and a non-display region B-B. The non-display region B-B is disposed around the display region A-A. It can be understood that the non-display region B-B can be used for wiring. Meanwhile, the non-display region BB can be used to connect to the housing 20, and a part where the non-display region BB is connected to the housing 20 can also be named as a bezel region of the terminal device 1.

Figure 3:
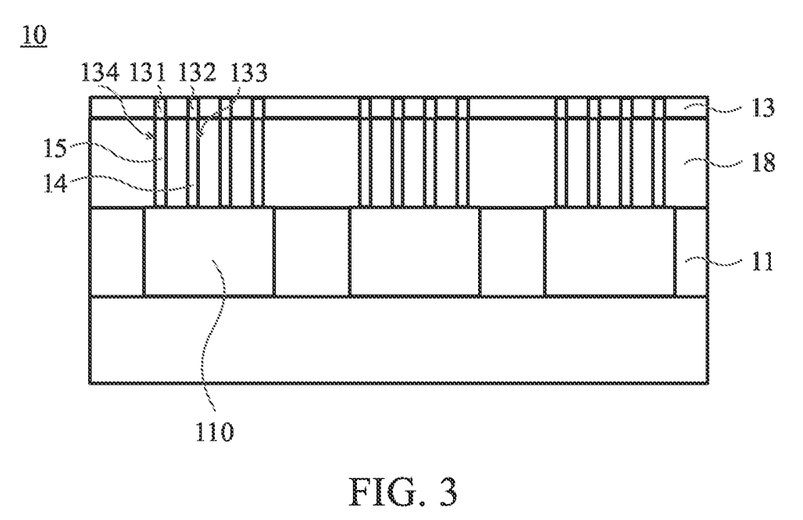
FIG. 3 is a sectional schematic diagram of a first partial structure in the display panel illustrated in FIG. 2.
Figure 4:
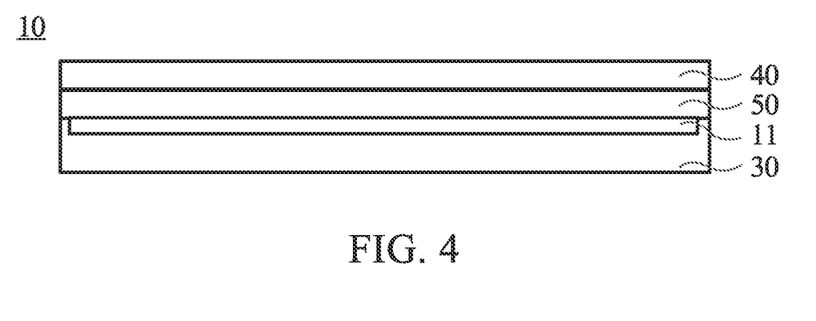
FIG. 4 is a sectional schematic diagram of a second partial structure in the display panel illustrated in FIG. 2.
Figure 5:
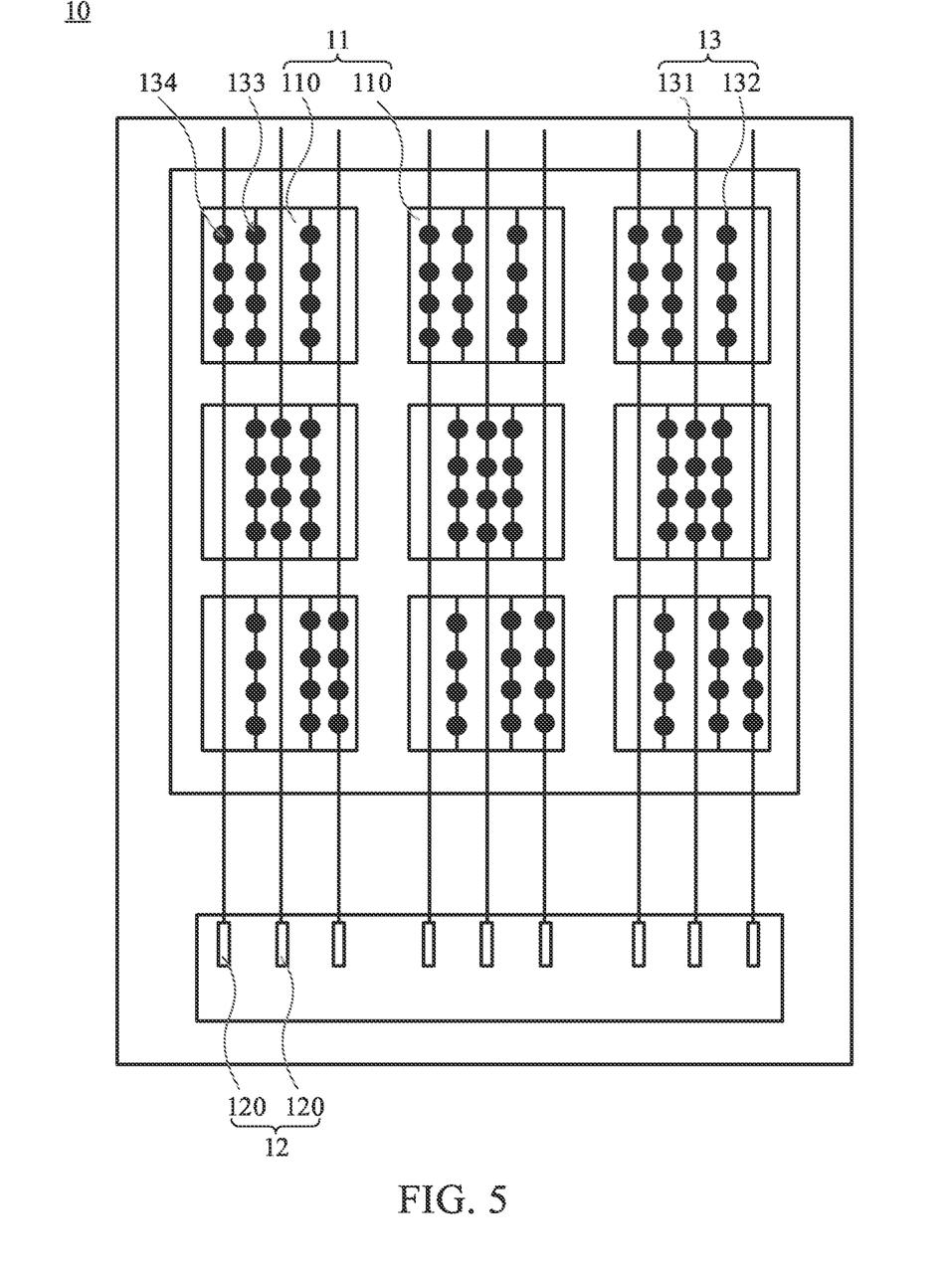
FIG. 5 is a second structural schematic diagram of the display panel of the terminal device illustrated in FIG. 1.
Figure 6:
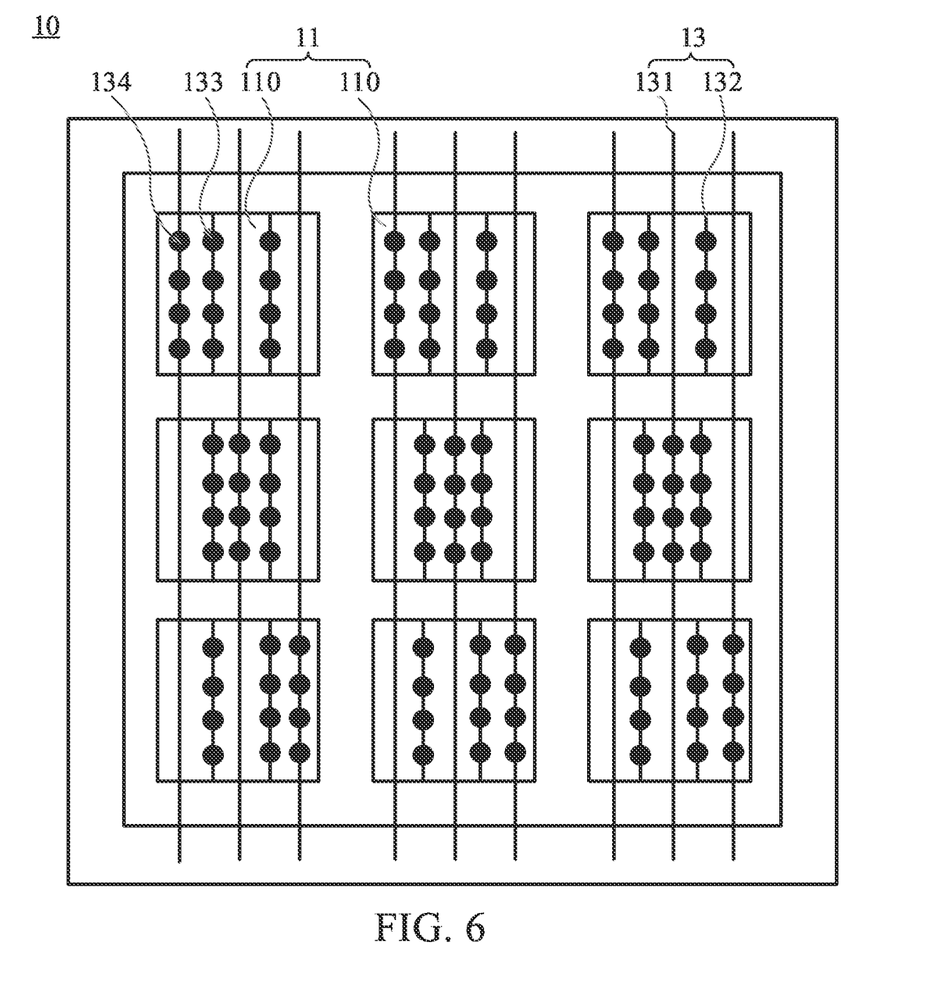
FIG. 6 is a third structural schematic diagram of the display panel of the terminal device illustrated in FIG. 1.

Exemplarily, please combine FIG. 1 and FIG. 2 and refer to FIG. 3 to FIG. 6. FIG. 3 is a sectional schematic diagram of a first partial structure in the display panel illustrated in FIG. 2. FIG. 4 is a sectional schematic diagram of a second partial structure in the display panel illustrated in FIG. 2. FIG. 5 is a second structural schematic diagram of the display panel of the terminal device illustrated in FIG. 1. FIG. 6 is a third structural schematic diagram of the display panel of the terminal device illustrated in FIG. 1. The display panel 10 can further include a touch layer 11, a touch chip 12, and a wire layer 13. The touch layer 11 can include a plurality of touch electrodes 110 arranged in an array manner. The plurality of touch electrodes 110 are disposed in the display region A-A. The touch chip 12 is disposed in the non-display region B-B. The touch chip 12 can include a plurality of touch pins 120. The wire layer 13 is disposed on a side of the touch layer 11. The wire layer 13 includes a plurality of touch wires 131 and a plurality of conductive wire segments 132. The plurality of touch wires 131 are correspondingly connected to a plurality of touch electrodes 110 and a plurality of touch pins 120 respectively. That is, each touch wire 131 is respectively connected to one touch electrode 110 to transmit a touch signal of the touch electrode 110. The plurality of conductive wire segments 132 are disposed in a same layer with the plurality of touch wires 131. Each of the conductive wire segments 132 and the touch electrodes 110 are in parallel connection. By configuring redundant wires in a form of the plurality of conductive wire segments 132, and by configuring each conductive wire segment 132 and the touch electrodes 110 to be in parallel connection, i.e., each touch electrode is provided with impedance of the parallel connection, overall impedance transmitted by the touch electrodes 110 and the conductive wire segments 120 can be reduced in this way. Therefore, voltage drop caused by the touch electrodes 110 and conductive wire segments 132 is reduced. Because the common electrodes and the touch electrodes 110 are sharing electrodes in a form of time-division driving, the voltage drop incurred by the common electrodes and the conductive wire segment 132 is reduced, thereby improving stability of the common voltage signal transmitted in the display region A-A of the display panel.

Exemplarily, the display panel 10 further includes a pixel layer. The pixel layer includes a plurality of pixel electrodes. The plurality of pixel electrodes are arranged in an array manner in the display region A-A. It should be noted that the pixel layer and the touch layer 11 are located in different layers and are disposed in a stack. A number of the pixel electrodes is greater than a number of the touch electrodes 110. For example, an area occupied by one touch electrode 110 is same as an regional area occupied by 64 pixel electrodes, i.e., one touch electrode 110 is disposed corresponding to the 64 pixel electrodes. Of course, the number of the 64 pixel electrodes is only an example, and should not be understood as a limitation to the number of pixel electrodes.

In another way, the display panel 10 can further include an array substrate 30, a color filter substrate 40, and a liquid crystal layer 50. The color filter substrate 40 is stacked on the array substrate 30. The liquid crystal layer 50 is disposed between the array substrate 30 and the color filter substrate 40. The touch layer 11 is also disposed between the array substrate 30 and the color filter substrate 40, and the touch layer 11 can be integrated in the array substrate 30. That is, the display panel 10 of the embodiments of the present application is a panel of integrating touch and display and manufactured by adopting the In-cell technology.

It should be noted that a transmission process or action principle of the touch signal can be as follows: when a user touches the touch electrode 110 in a certain region, a capacitance is formed between the user's finger and the touch electrode 110, and the capacitance will change, i.e., the variation of capacitance is used to characterize the touch signal from the user, and then, the touch signal is transmitted to a main control board of the terminal device 1, and the main control board performs a corresponding pre-set display control solution according to positional information of the touch signal.

The touch layer 11 includes the plurality of touch electrodes 110. A shape of each of the touch electrodes 110 can be a square sheet. A material of the touch electrodes 110 can be a transparent material, such as indium tin oxide (ITO), and the ITO are usually transparent and brown, or yellowish gray. Of course, the touch electrodes 110 can also be other types of transparent materials, which are not limited herein. When the touch layer 11 is manufactured, a layer of a transparent conductive material can be laid first, and then the entire surface of the conductive material can be divided to obtain the plurality of touch electrodes 110 arranged in the array manner.

Wherein, each of the touch electrodes 110 is connected to the touch chip 12 to transmit signals at each of the touch electrodes 110 to the touch chip 12, and then the signals are transmitted to the main control board of the terminal device 1 through the touch chip 12, thereby obtaining signal variation at each of the touch electrodes 110. The touch chip 12 can be understood as a signal conversion station. Of course, the touch chip 12 can also be a signal processing unit.

Exemplarily, the touch chip 12 can include a plurality of touch pins 120. The plurality of touch electrodes 110 are respectively connected to the plurality of touch pins 120 by the plurality of touch wires 131. It can be understood that one touch wire 131 is connected to one touch electrode 110 and one touch pin 120. This configuration can be more convenient to distinguish the positions of the touch electrodes 110 where variation of the touch signals occurs, thereby facilitating to performing corresponding display control solution. The touch wires 131 and the touch electrodes 110 are disposed in different layers. Connection between the touch wires 131 and the touch electrodes 110 is realized by defining via holes and disposing connection wires in the via holes. The display panel 10 can further include a spacer layer 18. The spacer layer 18 is disposed between the touch layer 11 and the plurality of conductive wire segments 132. For example, second via holes 134 can be defined in the spacer layer 18, and second connection wires 15 are disposed in the second via holes 134. Each of the touch wires 131 is connected to the touch electrodes 110 through the second connection wires 15 in the second via holes 134.

Exemplarily, the plurality of second via holes 134 are defined in regions where the spacer layer 18 corresponds to each of the touch electrodes 110, and each of the touch wires 131 are connected to the touch electrodes 110 through the plurality of second connection wires 15 in the plurality of second via holes 134. It can be understood that connecting the touch electrodes 110 to the touch wires 131 through a plurality of connection points can increase reliability of the connection. The second connection wires 15 and the conductive wire segments 131 can be integrated in one piece. For example, the touch electrodes 110 of a bottom layer and the second via holes 134 can be manufactured before the touch wires 131 are manufactured. When the touch wires 131 are manufactured, a layer of a metal of a conductive wire or the ITO can be directly laid. The metal of the conductive wire or the ITO can flow into the second via holes 134 to realize the connection with the touch electrodes 110. Then, the plurality of touch wires 131 are divided according to requirements.

It should be noted that when the touch wires 131 are manufactured, as a number of channels in the touch chip 12 is limited, and a number of assignable touch wires 131 is relative more, so a part of the touch wires 131 are used to connect to the touch pins 120, and the rest of the touch wires 131 act as auxiliary wires. In the prior art, the auxiliary wires are generally used to be connected to common signal lines in the non-display regions of the display panel, i.e., the auxiliary wires extend from the display region to two ends of the non-display region, and the auxiliary wires are connected to the common signal lines through via holes in the non-display region but do not perform effect on a common voltage signal in the display region of the display panel. As the common voltage signal of the display region is affected by impedance of the common electrode in the display region, an unstable situation of the common voltage signals is in presence.

On the basis of the aforesaid situation, the arrangement and connection mode of the auxiliary wires of the embodiments of the present application are improved.

Exemplarily, each of the auxiliary wires is configured to include the plurality of conductive wire segments 132, each of the conductive wire segments 132 is disposed corresponding to one touch electrode 110, and each of the conductive wire segments 132 and the touch electrode 110 are in parallel connection. The impedance and each touch electrode 110 in parallel connection can reduce an overall transmission impedance of the touch electrodes 110 and the conductive wire segments 132, thereby reducing the voltage drop between the touch electrodes 110 and the conductive wire segments 132. Because the common electrodes and the touch electrodes 110 are sharing electrodes of time division driving, stability of the common voltage signals transmitted in the display region A-A of the display panel 10 can be improved.

Exemplarily, at least two of the conductive wire segments 132 are disposed corresponding to each of the touch electrodes 110, and each of the conductive wire segments 132 is located between two of the touch wires 131. Each of the touch electrodes 110 can be provided with two, three or more conductive wire segments 132, so each of the touch electrodes 110 and more impedances can be in parallel connection, thereby making the impedance transmitted by each of the touch electrodes 110 to be reduced. Therefore, the impedance of the transmission of the common electrode is reduced, and the stability of the transmission of the common voltage signals in the display region A-A is improved. Wherein, the plurality of wire segments 132 in each column can be disposed parallelly. For example, the plurality of conductive wire segments 132 between two adjacent touch wires 131 are disposed parallelly. In another example, the plurality of conductive wires 132 between the two adjacent touch wires 131 are disposed on a straight line parallel to the touch wires 131. In this way, manufacture of the conductive wire segments 132 can be facilitated. For example, the auxiliary wires can be manufacture with the touch wires 131 together, each of the auxiliary wires is disposed between two adjacent touch wires 131, and then the auxiliary wires are divided into the plurality of discontinuous conductive wire segments 132.

Exemplarily, a width of the conductive wire segments 132 can be greater than a width of the touch wires 131. In this way, the impedance transmitted by the conductive wire segments 132 and the touch electrodes 110 can be made smaller, thereby making the stability of the signal transmission of the common electrodes to be higher. Exemplarily, a length of the conductive wire segments 132 can be less than or equal to a length of the touch electrodes 110. The length of the touch electrodes 110 can be understood as a dimension in a length direction of the conductive wire segments 132, thereby reducing mutual interference between the conductive wire segments 132 on different touch electrodes 110.

Connection between each of the conductive wire segments 132 and the touch electrodes 110 is also realized by defining via holes and disposing connection wires in the via holes. Exemplarily, a plurality of first via holes 133 are defined in the spacer layer 18 corresponding to each of the conductive wire segments 132, and first connection wires 14 are disposed in each of the first via holes 133 respectively, and the conductive wire segments 132 are connected to the touch electrodes 110 through the first connection wires 14 in the first via holes 133. The first connection wires 14 and the conductive wire segments 132 are integrated in one piece. It should be noted that the conductive wire segments 132 and the touch electrodes 110 are in parallel connection through the plurality of first via holes 133, which can be understood that the touch electrodes 110 and the plurality of impedances are in parallel connection, thereby making the impedance transmitted by the touch electrodes 110 to be smaller, i.e., improving the transmission stability of the common voltage signals.

Exemplarily, a length of each of the touch wires 131 is greater than a length of one of the auxiliary wires. It can be understood that the touch wires 131 are continuous wires, and are arranged in the display region A-A and the non-display region B-B. Furthermore, the auxiliary wires are disposed in segments and include the plurality of conductive wire segments 132. Therefore, the length of the auxiliary wires is less than the length of the touch wires 131.

In the display panel 10 provided by the embodiments of the present application, by configuring the auxiliary wires in a form of the plurality of conductive wire segments 132, and by configuring each conductive wire segment 132 and the touch electrodes 110 to be in parallel connection, i.e., each touch electrode 110 is provided with impedance of the parallel connection, overall impedance transmitted by the touch electrodes 110 and the conductive wire segments 132 can be reduced. Therefore, voltage drop caused by the touch electrodes 110 and conductive wire segments 132 is reduced. Because the common electrodes and the touch electrodes 110 are sharing electrodes in a form of time division driving, the voltage drop incurred by the common electrodes and the conductive wire segment 132 is reduced, thereby improving stability of the common voltage signal transmitted in the display region A-A of the display panel.

In above embodiments, the description of each embodiment has its emphasis, and for some embodiments that may not be detailed, reference may be made to the relevant description of other embodiments.

In the description of the present application, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly.

The above describes the display panel provided by the embodiments of the present application in detail. This article uses specific cases for describing the principles and the embodiments of the present application, and the description of the embodiments mentioned above is only for helping to understand the method and the core idea of the present application. Meanwhile, for those skilled in art, will have various changes in specific embodiments and application scopes according to the idea of the present application. In summary, the content of the specification should not be understood as limit to the present application.

What is claimed is:

1. A display panel, comprising:
   a touch layer comprising a plurality of touch electrodes arranged in an array manner;
   a plurality of touch wires, wherein each of the touch wires is connected to one of the touch electrodes respectively to transmit touch signals of the touch electrodes;
   a plurality of conductive wire segments disposed in a same layer with the touch wires, wherein each of the conductive wire segments and the touch electrodes are in parallel connection; and
   a spacer layer disposed between the touch layer and the plurality of conductive wire segments; wherein a plurality of first via holes are defined in the spacer layer corresponding to each of the conductive wire segments, first connection wires are disposed in each of the first via holes respectively, and each of the conductive wire segments are connected to the touch electrodes through the first connection wires in the plurality of first via holes.

2. The display panel as claimed in claim 1, wherein at least two of the conductive wire segments are disposed corresponding to each of the touch electrodes respectively, and each of the conductive wire segments is located between two of the touch wires.

3. The display panel as claimed in claim 2, wherein the plurality of conductive wire segments between two adjacent touch wires are disposed parallelly.

4. The display panel as claimed in claim 3, wherein the plurality of conductive wire segments between the two adjacent touch wires are disposed on a straight line parallel to the touch wires.

5. The display panel as claimed in claim 3, wherein a width of the conductive wire segments is greater than a width of the touch wires.

6. The display panel as claimed in claim 4, wherein a length of the conductive wire segments is less than or equal to a length of the touch electrodes.

7. The display panel as claimed in claim 1, wherein the first connection wires and the conductive wire segments are integrated in one piece.

8. The display panel as claimed in claim 1, wherein second via holes are disposed in the spacer layer, second connection wires are disposed in the second via holes, and
   each of the touch wires are connected to the touch electrodes through the second connection wires in the plurality of second via holes.

9. The display panel as claimed in claim 8, wherein the second connection wires and the conductive wire segments are integrated in one piece.

10. The display panel as claimed in claim 1, wherein the display panel comprises a display region and a non-display region disposed around the display region, and the plurality of touch electrodes are disposed in the display region.

11. The display panel as claimed in claim 10, wherein the display panel comprises:
    a touch chip disposed in the non-display region; and
    wherein the touch chip comprises a plurality of touch pins, and each of the touch pins is respectively connected to one of the touch wires.

12. The display panel as claimed in claim 8, wherein the display panel comprises:
    an array substrate;
    a color filter substrate stacked on the array substrate; and
    a liquid crystal layer disposed between the array substrate and the color filter substrate; and
    wherein the touch layer is integrated in the array substrate.

13. The display panel as claimed in claim 1, wherein the display panel comprises:
    a wire layer disposed on a side of the touch layer; and
    wherein the wire layer comprises the plurality of touch wires and the plurality of conductive wire segments.

14. The display panel as claimed in claim 1, wherein capacitance is formed between the touch electrodes and a user's finger, and variation of the capacitance is used to characterize the touch signals of the touch electrodes.

15. The display panel as claimed in claim 1, wherein a shape of the each of the touch electrodes is square.

16. The display panel as claimed in claim 1, wherein a material of the touch electrodes is indium tin oxide.

17. The display panel as claimed in claim 1, further comprising a plurality of common electrodes, wherein the touch electrodes and the common electrodes are sharing electrodes of time division driving.

18. The display panel as claimed in claim 1, wherein the display panel comprises a plurality of auxiliary wires, each of the auxiliary wires is disposed between two adjacent touch wires, and the auxiliary wires are divided into the plurality of discontinuous conductive wire segments.

19. The display panel as claimed in claim 18, wherein a length of the touch wires is greater than a length of the auxiliary wires.

20. The display panel as claimed in claim 1, wherein one or more conductive wire segments corresponding to one of the touch electrodes are located within boundary of the one of the touch electrodes in a top view, and the plurality of conductive wire segments corresponding to the touch electrodes in a same column and disposed between two adjacent touch wires are spaced apart.

* * * * *